United States Patent
Gloor

(10) Patent No.: US 11,592,579 B2
(45) Date of Patent: Feb. 28, 2023

(54) METHOD FOR SEARCHING FOR A TARGET OBJECT

(71) Applicant: Hilti Aktiengesellschaft, Schaan (LI)

(72) Inventor: Thomas Gloor, Triesen (LI)

(73) Assignee: Hilti Aktiengesellschaft, Schaan (LI)

( * ) Notice: Subject to any disclaimer, the term of this patent is extended or adjusted under 35 U.S.C. 154(b) by 120 days.

(21) Appl. No.: 16/955,313

(22) PCT Filed: Nov. 29, 2018

(86) PCT No.: PCT/EP2018/083017
§ 371 (c)(1),
(2) Date: Jun. 18, 2020

(87) PCT Pub. No.: WO2019/120929
PCT Pub. Date: Jun. 27, 2019

(65) Prior Publication Data
US 2021/0018633 A1  Jan. 21, 2021

(30) Foreign Application Priority Data
Dec. 21, 2017  (EP) .................................... 17209231

(51) Int. Cl.
| | |
|---|---|
| *G01S 19/44* | (2010.01) |
| *G01S 19/07* | (2010.01) |
| *G01S 19/37* | (2010.01) |
| *G01S 19/50* | (2010.01) |
| *G01C 15/06* | (2006.01) |
| *G01S 19/14* | (2010.01) |

(52) U.S. Cl.
CPC .............. *G01S 19/44* (2013.01); *G01C 15/06* (2013.01); *G01S 19/07* (2013.01); *G01S 19/14* (2013.01); *G01S 19/37* (2013.01); *G01S 19/50* (2013.01)

(58) Field of Classification Search
CPC ......... G01C 15/00; G01C 15/06; G01S 19/14; G01S 19/45; G01S 19/51
See application file for complete search history.

(56) References Cited

U.S. PATENT DOCUMENTS

| | | | |
|---|---|---|---|
| 6,035,254 A | 3/2000 | Nichols | |
| 8,035,553 B2 * | 10/2011 | Cerniar | ................... G01S 19/14 342/357.34 |
| 8,422,032 B2 | 4/2013 | Buehlmann et al. | |
| 2014/0350886 A1 | 11/2014 | Metzler | |

FOREIGN PATENT DOCUMENTS

| | | | | |
|---|---|---|---|---|
| EP | 2 040 030 A1 | 3/2009 | | |
| EP | 2 570 769 A1 | 3/2013 | | |
| GB | 2573090 A | * 10/2019 | ............. | G01C 21/20 |

OTHER PUBLICATIONS

PCT/EP2018/083017, International Search Report dated Mar. 19, 2019 (Two (2) pages).

* cited by examiner

*Primary Examiner* — Cassi J Galt
(74) *Attorney, Agent, or Firm* — Crowell & Moring LLP

(57) ABSTRACT

A method for searching for a target object, which is moved along a path, by a measuring device which has a first reference system, a control device, and an operating controller which has a GNSS receiver having a second reference system and which is connectable to the measuring device via a communication connection.

13 Claims, 4 Drawing Sheets

METHOD FOR SEARCHING FOR A TARGET OBJECT

CROSS REFERENCE TO RELATED APPLICATIONS

This application claims the priority of International Application No. PCT/EP2018/083017, filed Nov. 29, 2018, and European Patent Document No. 17209231.4, filed Dec. 21, 2017, the disclosures of which are expressly incorporated by reference herein.

BACKGROUND AND SUMMARY OF THE INVENTION

The present invention relates to a method for searching for a target object and an apparatus for performing such a method.

During the tracking of a target object by a measuring device, it is possible for the measuring device to lose contact with the target object and not be able to determine measurement coordinates at the measurement position of the target object. This situation is also referred to as "loss of contact". To improve searching for the target object and reduce the time required therefor, various measures are known from the prior art. Active target objects can transmit a signal in the event of "loss of contact", which signal is received by the measuring device. However, active target objects have the disadvantage over passive target objects that they require a power supply.

The object of the present invention is to develop a method for searching for a passive target object that involves reduced equipment complexity and requires no additional components for searching for the passive target object.

The method according to the invention for searching for a target object, which is moved along a path, by means of a measuring device, which has a first reference system, a control device and an operating controller, which has a GNSS receiver having a second reference system and which is connectable to the measuring device via a communication connection, comprises the following steps:
  if the measuring device has lost contact with the target object, the GNSS receiver is used to determine current position coordinates of the operating controller in the second reference system,
  the current position coordinates of the operating controller are transformed from the second reference system into transformed position coordinates in the first reference system by the control device by means of a known transformation function,
  the control device determines a starting orientation for the measuring device from the transformed position coordinates of the operating controller in the first reference system, wherein the measuring device in the starting orientation is aligned with the operating controller, and
  the measuring device is moved in accordance with a preset routine to search for the target object.

The method according to the invention for searching for a target object has the advantage that an already available GNSS receiver of the operating controller is used to determine a starting orientation for the measuring device to search for the passive target object, so that no additional components are required and the equipment complexity is reduced. The current position of the operating controller can be used to improve the search for a target object, since the user moves the target object along the path in single-man mode and carries the operating controller with him. The shorter the distance between the target object and the operating controller, the smaller the difference between the position of the operating controller and the position of the target object.

If the measuring device has lost contact with the target object, the control device gives a command to the GNSS receiver to determine current position coordinates of the operating controller in the second reference system. The current position coordinates of the operating controller are transformed from the second reference system into transformed position coordinates in the first reference system by the control device by means of a known transformation function. The control device determines a starting orientation for the measuring device from the transformed position coordinates of the operating controller in the first reference system, wherein the measuring device in the starting orientation is aligned with the operating controller. The measuring device is moved from the starting orientation in accordance with a preset routine in order to search for the target object.

Preferably, while the target object is moving along the path, i-th measurement coordinates are determined in the first reference system of the measuring device in M, M≥2 measurement positions of the target object by means of the measuring device and j-th GNSS coordinates of the operating controller are determined in the second reference system in N, N≥2 positions of the operating controller by means of the GNSS receiver, wherein the i-th measurement coordinates are transmitted from the measuring device to the control device and the j-th GNSS coordinates are transmitted from the GNSS receiver to the control device. The i-th measurement coordinates and the j-th GNSS coordinates are used to determine the transformation function between the second reference system and the first reference system. The transformation function is necessary in order to be able to determine the current position of the operating controller in the first reference system.

In a first variant, i-th timestamps are assigned to the i-th measurement coordinates by the measuring device and/or j-th timestamps are assigned to the j-th GNSS coordinates by the GNSS receiver, and the i-th timestamps and/or j-th timestamps are transmitted to the control device. The i-th timestamps and j-th timestamps allow association of the measurement coordinates and GNSS coordinates in order to determine the transformation function between the second reference system and the first reference system.

In a second variant, i-th timestamps are assigned to the i-th measurement coordinates by the control device and/or j-th timestamps are assigned to the j-th GNSS coordinates by the control device. If the measuring device and/or the GNSS receiver do not have a timing device, the control device can assign the timestamps during the transmission.

Particularly preferably j-th GNSS coordinates are assigned to i-th measurement coordinates by the control device if the time difference between the i-th timestamp of the i-th measurement coordinates and the j-th timestamp of the j-th GNSS coordinates is minimal.

Particularly preferably, j-th GNSS coordinates are assigned to i-th measurement coordinates by the control device if the time difference between the i-th timestamp of the i-th measurement coordinates and the j-th timestamp of the j-th GNSS coordinates is less than a preset maximum time difference.

The assignment of i-th measurement coordinates to j-th GNSS coordinates is necessary in order to be able to determine the transformation function between the second reference system and the first reference system. The correct association between i-th measurement coordinates and j-th GNSS coordinates is important particularly for fast-moving target objects in order to reduce inaccuracies.

The control device determines a respective time difference for the i-th measurement coordinates and j-th GNSS coordinates and assigns those j-th GNSS coordinates that have the smallest time difference to the i-th measurement coordinates of the target object. The assignment of the i-th timestamps to the i-th measurement coordinates and of the j-th timestamps to the j-th GNSS coordinates can take place during actual determination of the i-th measurement coordinates and j-th GNSS coordinates, or the timestamps are assigned to the i-th measurement coordinates and j-th GNSS coordinates by the control device during the transmission to the control device.

A first preferred variant comprises the following steps:
the i-th measurement coordinates and i-th timestamps are determined as first data points by the control device,
a first fit curve is adapted for the first data points by the control device,
the control device determines first approximation coordinates from the first fit curve at first times, wherein the first times correspond to the j-th timestamps of the j-th GNSS coordinates, and
the transformation function between the second reference system and the first reference system is determined by the control device at least in part by means of the first approximation coordinates and the j-th GNSS coordinates.

A second preferred variant comprises the following steps:
the j-th GNSS coordinates and j-th timestamps are determined as second data points by the control device,
a second fit curve is adapted for the second data points by the control device,
the control device determines second approximation coordinates from the second fit curve at second times, wherein the second times correspond to the i-th timestamps of the i-th measurement coordinates, and
the transformation function between the second reference system and the first reference system is determined by the control device at least in part by means of the i-th measurement coordinates and second approximation coordinates.

A third preferred variant comprises the following steps:
the i-th measurement coordinates and i-th timestamps are determined as first data points by the control device, and a first fit curve is adapted for the first data points by the control device,
the j-th GNSS coordinates and j-th timestamps are determined as second data points by the control device, and a second fit curve is adapted for the second data points by the control device,
the control device determines first approximation coordinates from the first fit curve and second approximation coordinates from the second fit curve at prescribed times and
the transformation function between the second reference system and the first reference system is determined by the control device at least in part by means of the first approximation coordinates and second approximation coordinates.

The apparatus for performing a method for searching for a target object has a measuring device, a control device, an operating controller, which has a GNSS receiver, and a communication connection, which connects the measuring device and the operating controller to one another.

In a first preferred variant, the GNSS receiver is permanently installed in the operating controller. An operating controller having a permanently installed GNSS receiver requires no additional components for searching for a passive target object.

In a second preferred variant, the GNSS receiver is connected to the operating controller via a data interface. The option of connecting the GNSS receiver via a data interface allows the use of operating controllers that have no permanently installed GNSS receiver. Any external GNSS receiver connectable to the operating controller via a data interface assists the search for a passive target object.

Exemplary embodiments of the invention are described hereinafter with reference to the drawings. It is not necessarily intended for this to illustrate the exemplary embodiments to scale; instead, the drawings, where conducive to elucidation, is produced in schematic and/or slightly distorted form. It should be taken into account here that various modifications and alterations relating to the form and detail of an embodiment may be undertaken without departing from the general concept of the invention. The general concept of the invention is not limited to the exact form or the detail of the preferred embodiment shown and described hereinafter or limited to subject matter that would be limited compared to the subject matter claimed in the claims. For given design ranges, values within the limits mentioned will also be disclosed as limit values and will be usable and claimable as desired. For the sake of simplicity, identical reference characters are used hereinafter for identical or similar parts or parts having identical or similar function.

DETAILED DESCRIPTION OF THE DRAWINGS

Figure 1A:
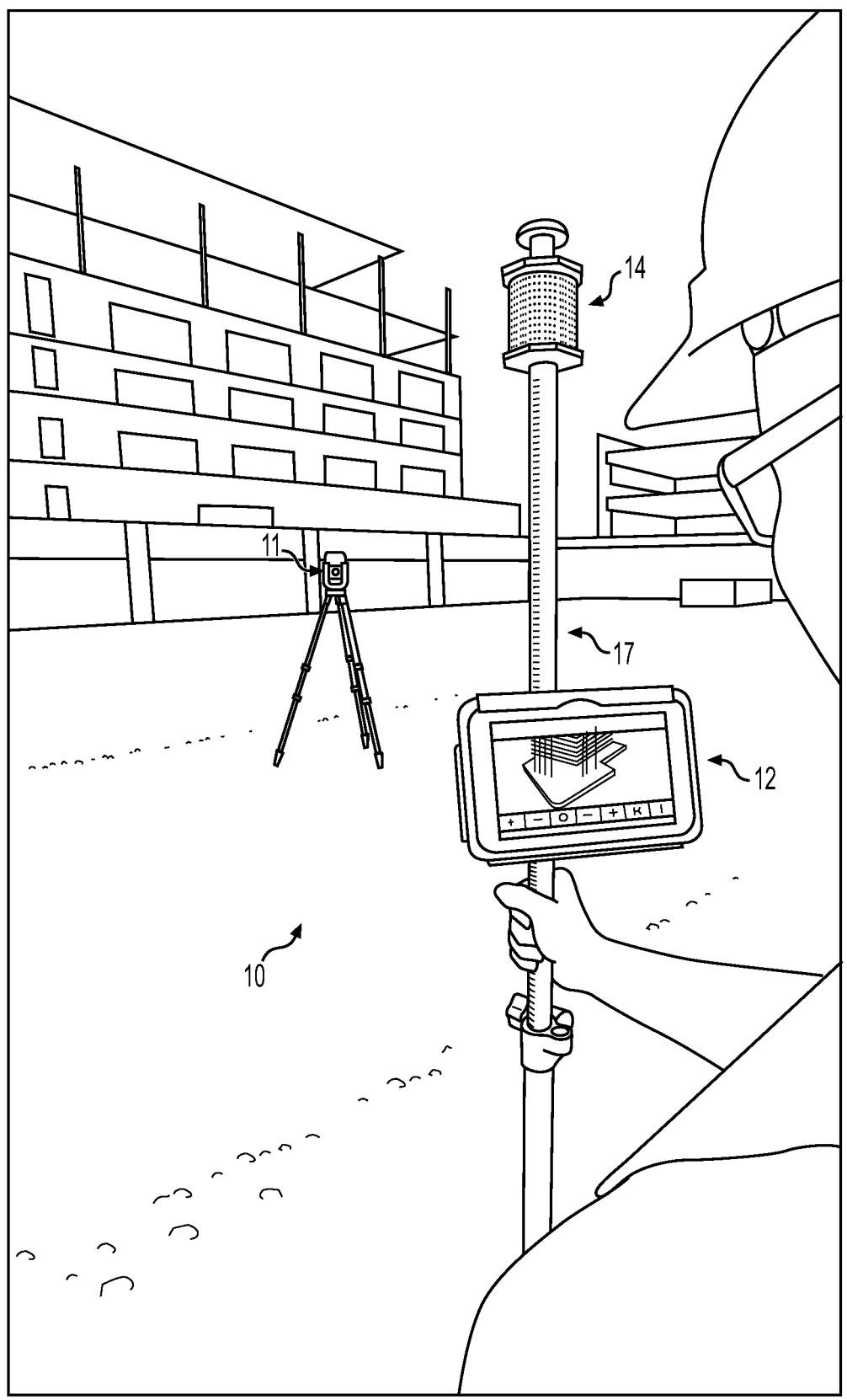
FIGS. 1A and B show an apparatus having a measuring device, an operating controller and a communication connection in a three-dimensional depiction (FIG. 1A) and in a block diagram (FIG. 1B)
Figure 1B:
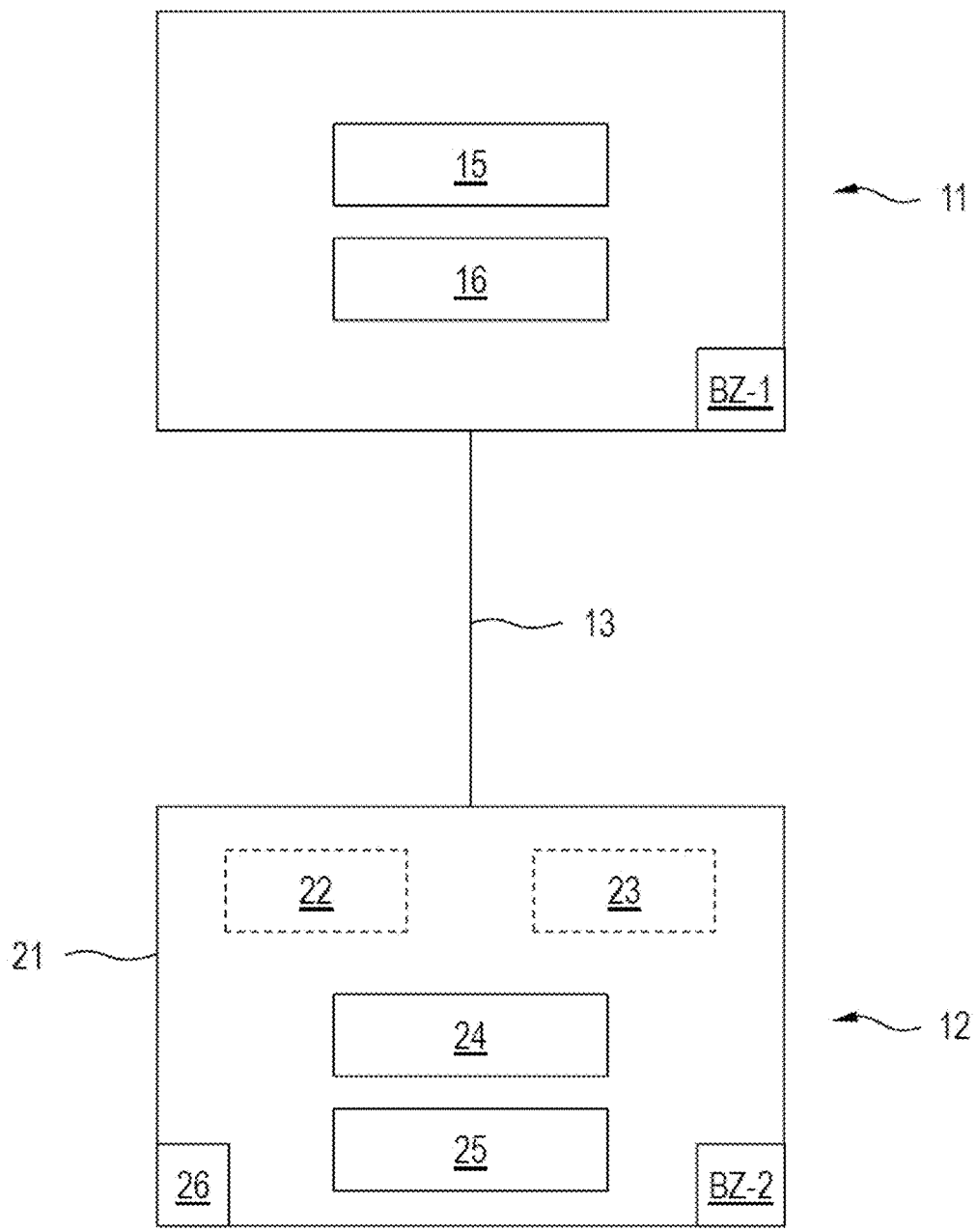

FIGS. 1A and B show an apparatus 10, which comprises a measuring device 11, an operating controller 12 and a communication connection 13, for performing a method according to the invention for searching for a target object. FIG. 1A shows the apparatus in a three-dimensional depiction and FIG. 1B shows the design of the apparatus 10 in a block diagram.

The communication connection 13 connects the measuring device 11 and the operating controller 12 to one another and is in the form of a wireless communication connection. Suitable wireless communication connections are all known technologies for data transfer, such as for example Bluetooth, radio, WiFi, infrared, etc. The measuring device 11 is in the form of a total station and is used inter alia to track a target object 14; the target object 14 is in the form of a passive target object. The measuring device 11 comprises a distance measuring unit 15 and an angle measuring unit 16. The target object 14 is mounted on a support rod 17 and is moved by a user. The support rod 17 can have a receiving element mounted on it that receives the operating controller 12; alternatively, the user can hold the operating controller 12 in his hand during movement of the support rod 17.

During the tracking of the target object 14 by the measuring device 11, it is possible for the measuring device 11 to lose contact with the target object 14 and not be able to determine measurement coordinates at the measurement position of the target object 14. This situation is also referred to as "loss of contact". To improve searching for the target object 14 and reduce the time required therefor, the apparatus 10 can perform a method according to the invention for searching for the target object 14.

The operating controller 12 comprises a housing 21, a control device 22, which is arranged inside the housing 21, a GNSS receiver 23, which is arranged inside the housing 21, an operating device 24 and a display device 25. The GNSS receiver 23 in the exemplary embodiment is permanently installed in the housing 21; alternatively, the GNSS receiver can be in the form of an external GNSS receiver and connected to the control device 22 via a data interface 26 of the operating controller 12.

The operating device 24 and display device 25 in the exemplary embodiment are in the form of separate elements in the form of a keypad and a display; alternatively, the operating device 24 and display device 25 can be integrated in a touchscreen together. The operating device 24 and display device 25 are embedded in the housing 21 of the operating controller 12 and permanently connected to the housing 21; alternatively, the operating device 24 and the display device 25 or the operating and display device 24, 25 can be in the form of separate elements and connected to the control device 22 via a data interface (USB, Bluetooth, WiFi).

Figure 2A:
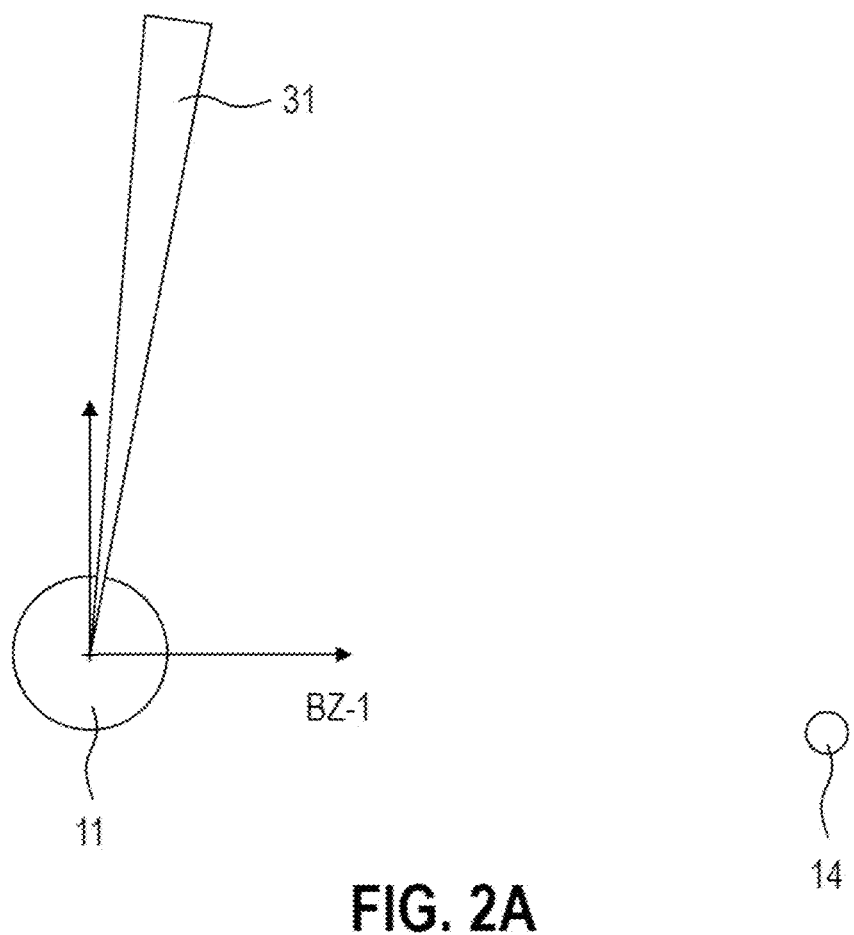
FIGS. 2A and B show an arrangement in which the measuring device has lost contact with a target object and a method according to the invention is used to search for a target object.
Figure 2B:
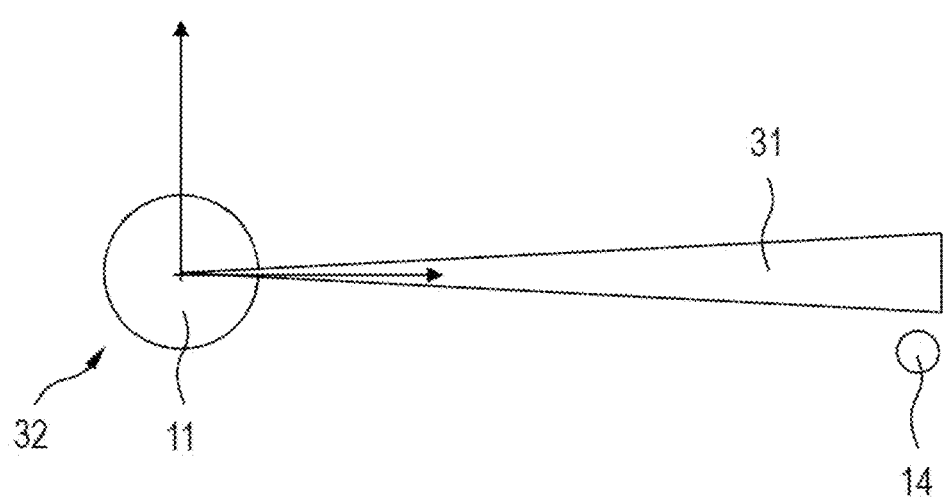

FIGS. 2A and B schematically show an arrangement in which the measuring device 11 has lost contact with the target object 14 and the method according to the invention is used to search for a target object. FIG. 1A shows the measuring device 11 in an orientation in which the target object 14 is situated outside a field of view 31 of the measuring device 11; the measuring device 11 has lost contact with the target object 14.

Performance of the method according to the invention for searching for a target object is controlled by the control device 22 of the operating controller 12. The control device 22 gives a command to the GNSS receiver 23 to determine current position coordinates $P_{curr}$ of the operating controller 12 in the second reference system BZ-2 of the GNSS receiver 23. The current position coordinates $P_{curr}$ of the operating controller 12 are transformed into transformed position coordinates in the first reference system BZ-1 of the measuring device 11 by the control device 22 by means of a known transformation function. Subsequently, the control device 22 determines a starting orientation 32 for the measuring device 11 from the transformed position coordinates of the operating controller 12. In this case, the starting orientation 32 corresponds to an orientation of the measuring device 11 in which the measuring device 11 is aligned with the transformed position coordinates of the operating controller 12. The measuring device 11 is moved from the starting orientation 32 in accordance with a preset routine in order to search for the target object 14.

Figure 3:
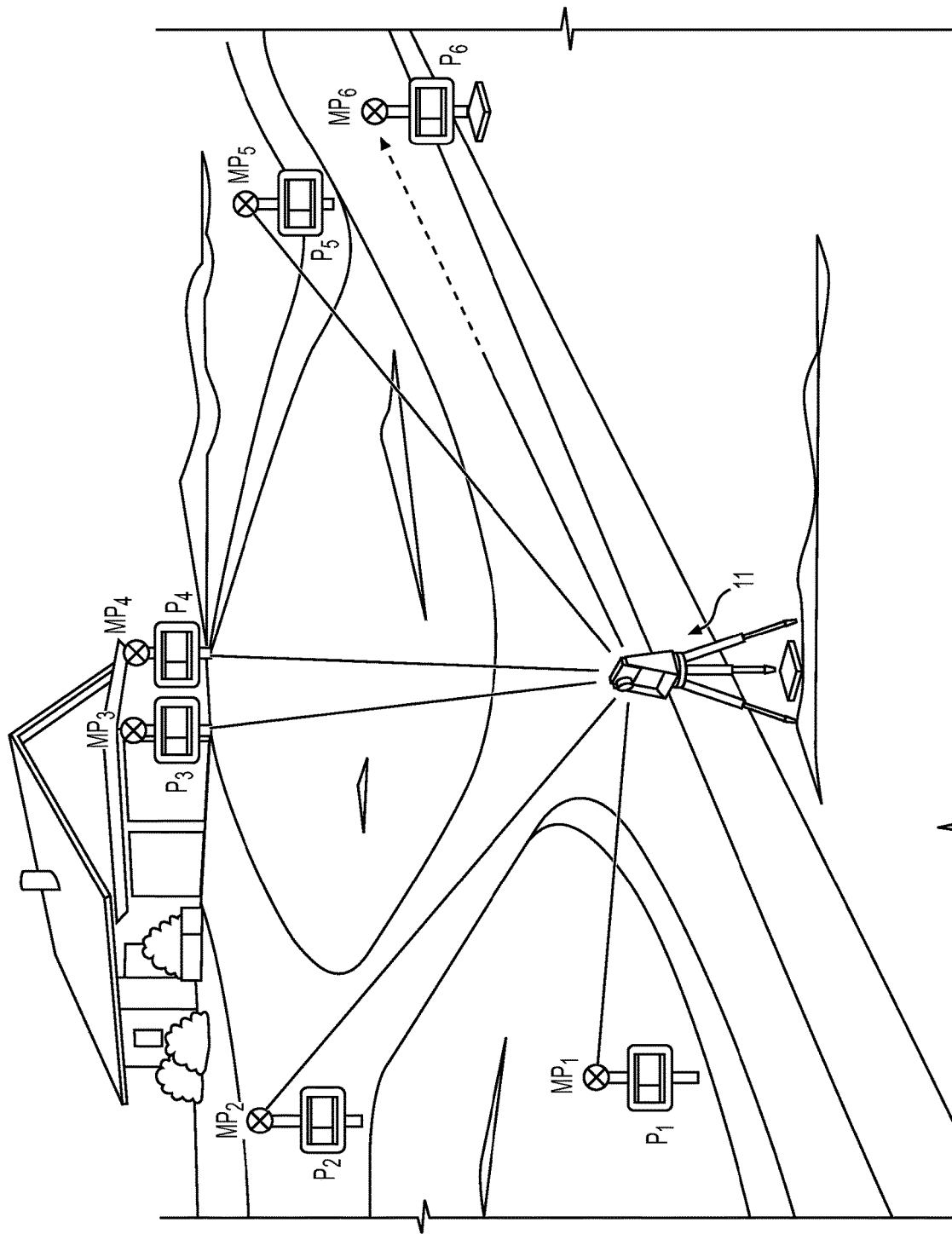
FIG. 3 shows a scenario that can be used to determine a transformation function between a second reference system of a GNSS receiver and a first reference system of the measuring device.

The method according to the invention for searching for a target object presupposes that the transformation function between the second reference system BZ-2 and the first reference system BZ-1 is known. FIG. 3 shows a scenario that can be used to determine the transformation function. The target object 14 is moved along a path by a user. The measuring device 11 captures measurement coordinates in multiple measurement positions of the target object 14, and the GNSS receiver 23 captures GNSS coordinates in multiple positions of the operating controller 12. The exemplary embodiment shows six measurement positions for the target object 14 and six positions for the operating controller 12. In the general case, the target object 14 is arranged in M different measurement positions $MP_i$, i=1 ... M, and the operating controller 12 is arranged in N different positions $P_j$, j=2 ... N. The numbers M and N may be identical or different. In each measurement position $MP_i$, the measuring device 11 determines i-th measurement coordinates $MK_i$, i=1 ... M for the target object 14, wherein the i-th measurement coordinates $MK_i$ are captured in a first reference system BZ-1 of the measuring device 11. In each position $P_j$, the GNSS receiver 23 determines j-th GNSS coordinates $K_j$, j=1 ... N for the operating controller 12, wherein the j-th GNSS coordinates $K_j$ are captured in a second reference system BZ-2 of the GNSS receiver 23.

In a first variant, the i-th measurement coordinates $MK_i$ and i-th timestamps $t_i$ are determined as first data points by the control device 22. The control device 22 adapts a first fit curve for the first data points, wherein known fit curves can be used. The control device 22 determines first approximation coordinates from the first fit curve at first times $\tau_{1k}$, wherein the first times $\tau_{1k}$ correspond to the j-th timestamps $T_j$ of the j-th GNSS coordinates $K_j$. The control device 22 determines the transformation function between the second reference system BZ-2 of the GNSS receiver 23 and the first reference system BZ-1 of the measuring device 11 by using the first approximation coordinates and the j-th GNSS coordinates $K_j$.

In a second variant, the j-th GNSS coordinates $K_j$ and j-th timestamps $T_j$ are determined as second data points by the control device 22. The control device 22 adapts a second fit curve for the second data points, wherein known fit curves can be used. The control device 22 determines second approximation coordinates from the second fit curve at second times $\tau_{2k}$, wherein the second times $\tau_{2k}$ correspond to the i-th timestamps $t_i$ of the i-th measurement coordinates. The control device 22 determines the transformation function between the second reference system BZ-2 of the GNSS receiver 23 and the first reference system BZ-1 of the measuring device 11 by using the i-th measurement coordinates $MK_i$ and the second approximation coordinates.

In a third variant, the i-th measurement coordinates $MK_i$ and i-th timestamps $t_i$ are determined as first data points by the control device 22, and a first fit curve is adapted for the first data points by the control device 22. The j-th GNSS coordinates $P_j$ and j-th timestamps $T_j$ are determined as second data points by the control device 22, and a second fit curve is adapted for the second data points by the control device 22. The control device 22 determines first approximation coordinates from the first fit curve and second approximation coordinates from the second fit curve at prescribed times $\tau_k$. The control device 22 determines the transformation function between the second reference system BZ-2 of the GNSS receiver 23 and the first reference system BZ-1 of the measuring device 11 by using the first approximation coordinates and second approximation coordinates.

The invention claimed is:

1. A method for searching for a target object (14), which is moved along a path, by a measuring device (11) which has a first reference system (BZ-1) and an operating controller (12) which has a control device (22) and a GNSS receiver (23) having a second reference system (BZ-2), wherein the operating controller (12) is separate from the measuring device (11) and the target object (14), is co-located with the target object (14), and is connectable to the measuring device (11) via a communication connection (13), comprising the steps of:
- determining that the measuring device (11) has lost contact with the target object (14),
- using the GNSS receiver (23) to determine current position coordinates of the operating controller (12) in the second reference system (BZ-2);
- transforming the current position coordinates of the operating controller (12) from the second reference system (BZ-2) into transformed position coordinates in the first reference system (BZ-1) by the control device (22) by a known transformation function;
- determining by the control device (22) a starting orientation (32) for the measuring device (11) from the transformed position coordinates of the operating controller (12) in the first reference system, wherein the measuring device (11) in the starting orientation (32) is aligned with the operating controller (12);
- communicating the starting orientation (32) by the control device (22) via the communication connection (13) to the measuring device (11); and
- moving the measuring device (11) in accordance with a preset routine to search for the target object (14).

2. The method as claimed in claim 1, wherein while the target object (14) is moving along the path, i-th measurement coordinates ($MK_i$, i=1 M) are determined in the first reference system (BZ-1) of the measuring device (11) in M, M≥2 measurement positions ($MP_i$, i, i=1 ... M) of the target object (14) by the measuring device (11) and j-th GNSS coordinates ($K_j$, j= ... N) of the operating controller (12) are determined in the second reference system (BZ-2) of the GNSS receiver (23) in N, N 2 positions ($P_j$, j=1 ... N) of the operating controller (12) by the GNSS receiver (23), wherein the i-th measurement coordinates ($MK_i$) are transmitted from the measuring device (11) to the control device (22) and the j-th GNSS coordinates ($K_j$) are transmitted from the GNSS receiver (23) to the control device (22).

3. The method as claimed in claim 2, wherein i-th timestamps ($t_i$, i=1 ... M) are assigned to the i-th measurement coordinates ($MK_1$, i=1 ... M) by the measuring device (11) and j-th timestamps ($T_j$, j=1 ... N) are assigned to the j-th GNSS coordinates ($K_j$, j=1 ... N) by the GNSS receiver (23), and the i-th timestamps ($t_i$) and j-th timestamps ($T_j$) are transmitted to the control device (22).

4. The method as claimed in claim 2, wherein i-th timestamps ($t_i$, i=1 ... M) are assigned to the i-th measurement coordinates ($MK_i$, i=1 ... M) by the control device (22) and j-th timestamps ($T_j$, j=1 ... N) are assigned to the j-th GNSS coordinates ($K_j$, j=1 ... N) by the control device (22).

5. The method as claimed in claim 3, wherein j-th GNSS coordinates ($K_j$) are assigned to i-th measurement coordinates ($MK_i$) by the control device (22) if a time difference ($\Delta t_{ij}$) between the i-th timestamp ($t_i$) of the i-th measurement coordinates ($MK_i$) and the j-th timestamp ($T_j$) of the j-th GNSS coordinates ($K_j$) is minimal.

6. The method as claimed in claim 3, wherein j-th GNSS coordinates ($K_j$) are assigned to i-th measurement coordinates ($MK_i$) by the control device (22) if a time difference ($\Delta t_{ij}$) between the i-th timestamp (t) of the i-th measurement coordinates ($MK_i$) and the j-th timestamp ($T_j$) of the j-th GNSS coordinates ($K_j$) is less than a preset maximum time difference ($\Delta t_{max}$).

7. The method as claimed in claim 5, wherein the transformation function between the second reference system (BZ-2) and the first reference system (BZ-1) is determined by the control device (22) at least in part by the i-th measurement coordinates ($MK_i$, i=1 M) and the j-th GNSS coordinates ($K_j$, j=1 ... N).

8. The method as claimed in claim 3, further comprising the steps of:
- determining the i-th measurement coordinates ($MK_i$, i=1 ... M) and i-th timestamps ($t_i$, i=1 ... M) as first data points by the control device (22);
- adapting a first fit curve for the first data points by the control device (22);
- determining by the control device (22) first approximation coordinates from the first fit curve at first times ($t_{1k}$), wherein the first times ($t_{1k}$) correspond to the j-th timestamps ($T_j$, j=1 ... N) of the j-th GNSS coordinates ($K_j$, j=1 ... N); and
- determining the transformation function between the second reference system (BZ-2) and the first reference system (BZ-1) by the control device (22) at least in part by the first approximation coordinates and the j-th GNSS coordinates ($K_j$, j=1 ... N).

9. The method as claimed in claim 3, further comprising the steps of:
- determining the j-th GNSS coordinates ($K_j$, j=1 ... N) and j-th timestamps ($T_j$ j=1 ... N) as second data points by the control device (22);
- adapting a second fit curve for the second data points by the control device (22);
- determining by the control device (22) second approximation coordinates from the second fit curve at second times ($t_{2k}$), wherein the second times ($t_{2k}$) correspond to the i-th timestamps ($t_i$) of the i-th measurement coordinates; and
- determining the transformation function between the second reference system (BZ-2) and the first reference system (BZ-1) by the control device (22) at least in part by the i-th measurement coordinates ($MK_i$, i=1 ... M) and second approximation coordinates.

10. The method as claimed in claim 3, further comprising the steps of:
- determining the i-th measurement coordinates ($MK_i$, i=1 ... M) and i-th timestamps ($t_i$, i=1 ... M) as first data points by the control device (22), and a first fit curve is adapted for the first data points by the control device (22);
- determining the j-th GNSS coordinates ($P_j$, j=1 ... N) and j-th timestamps ($T_j$, j=1 ... N) as second data points by the control device (22), and a second fit curve is adapted for the second data points by the control device (22);
- determining by the control device (22) first approximation coordinates from the first fit curve and second approximation coordinates from the second fit curve at prescribed times ($t_k$); and
- determining the transformation function between the second reference system (BZ-2) and the first reference system (BZ-1) of the measuring device (11) by the control device (22) at least in part by the first approximation coordinates and second approximation coordinates.

11. An apparatus for performing the method for searching for the target object (14) as claimed in claim 1, comprising:
- a measuring device (11);
- an operating controller (12) which has a control device (22) and a GNSS receiver (23); and
- a communication connection (13) which connects the measuring device (11) and the operating controller (12) to one another.

12. The apparatus as claimed in claim 11, wherein the GNSS receiver (23) is permanently installed in the operating controller (12).

13. The apparatus as claimed in claim 11, wherein the GNSS receiver (23) is connected to the operating controller (12) via a data interface (26).

* * * * *